United States Patent
Ge et al.

(10) Patent No.: US 7,538,890 B2
(45) Date of Patent: May 26, 2009

(54) WAVEFRONT-MEASURING INTERFEROMETER APPARATUS, AND LIGHT BEAM MEASUREMENT APPARATUS AND METHOD THEREOF

(75) Inventors: Zongtao Ge, Saitama (JP); Takayuki Saito, Saitama (JP); Minoru Kurose, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 249 days.

(21) Appl. No.: 11/144,709

(22) Filed: Jun. 6, 2005

(65) Prior Publication Data
US 2005/0270543 A1   Dec. 8, 2005

(30) Foreign Application Priority Data

| Jun. 7, 2004 | (JP) | ............................. 2004-168965 |
| Jun. 7, 2004 | (JP) | ............................. 2004-168966 |
| Apr. 26, 2005 | (JP) | ............................. 2005-128344 |

(51) Int. Cl.
*G01B 11/02* (2006.01)

(52) U.S. Cl. .................................................. 356/512

(58) Field of Classification Search ................ 356/495, 356/489, 512–515
See application file for complete search history.

(56) References Cited

U.S. PATENT DOCUMENTS 6,025,912 A * 2/2000 Prikryl et al. ............... 356/521
6,542,247 B2 * 4/2003 Bockman .................... 356/493
6,721,094 B1 * 4/2004 Sinclair et al. .............. 359/386
2003/0025916 A1 * 2/2003 Ina ............................. 356/513
2004/0141184 A1 * 7/2004 Ueki ........................... 356/497

FOREIGN PATENT DOCUMENTS

| CN | 1153297 A1 | 7/1997 |
| EP | 0 736 759 A2 | 10/1996 |
| JP | 58-060590 | 4/1983 |
| JP | 58060590 A * | 4/1983 |
| JP | 2000-097612 | 4/2000 |
| JP | 2000097612 A * | 4/2000 |
| JP | 2004-045327 | 2/2004 |
| JP | 2004045327 A * | 2/2004 |

* cited by examiner

*Primary Examiner*—Tarifur Chowdhury
*Assistant Examiner*—Jonathan M Hansen
(74) *Attorney, Agent, or Firm*—Birch, Stewart, Kolasch & Birch, LLP

(57) ABSTRACT

The light beam measurement apparatus comprises a beam splitter that divides a light beam emitted from a light source unit into two luminous fluxes, a semi-transmitting/reflecting surface that reflects part of one of the divided luminous fluxes back in the opposite direction to the direction of incidence as a sample luminous flux, and reflection-type reference light producing means that converts part of the luminous flux transmitted through the semi-transmitting/reflecting surface into a wavefront-shaped reference luminous flux and outputs this reference luminous flux; this light beam measurement apparatus can carry out both wavefront measurement and light beam spot characteristic measurement on a light beam simultaneously.

13 Claims, 6 Drawing Sheets

WAVEFRONT-MEASURING INTERFEROMETER APPARATUS, AND LIGHT BEAM MEASUREMENT APPARATUS AND METHOD THEREOF

RELATED APPLICATIONS

The present application claims the priorities of Japanese Patent Application No. 2004-168965 filed on Jun. 7, 2004, No. 2004-168966 filed on Jun. 7, 2004, and No. 2005-128344 filed on Apr. 26, 2005, which are incorporated herein by reference.

BACKGROUND OF THE INVENTION

1. Field of the Invention

The present invention relates to a wavefront-measuring interferometer apparatus for carrying out wavefront measurement on a light beam to be measured, and a light beam measurement apparatus and method thereof for carrying out wavefront measurement on a light beam and various types of measurement on a condensed spot of the light beam.

2. Description of the Prior Art

Hitherto, there has been known an apparatus (also known as a beam profiler) that forms a spot image on a CCD image pickup surface or the like of a light beam to be measured, and carries out measurement of the size or shape, or the intensity distribution or barycentric coordinates or the like of the spot image (hereinafter these are referred to collectively as 'light beam spot characteristic measurement') (see Japanese Unexamined Patent Publication No. 2004-45327).

Moreover, as an apparatus that carries out wavefront measurement on a light beam, there has been known a wavefront-measuring interferometer apparatus having a Mach-Zehnder interferometer optical system layout as shown in FIG. 8.

With the wavefront-measuring interferometer apparatus shown in FIG. 8, a light beam emitted from a light source unit 101 is divided into two luminous fluxes by a beam splitter 102. One of these two luminous fluxes is converged by a converging lens 103, and is then incident on a pinhole 104 disposed at the convergent point of the converging lens 103. The pinhole 104 is constituted so as to have a diameter smaller than the diffraction limit of the converged luminous flux, so that a wavefront-shaped ideal spherical wave is emitted from the rear of the pinhole 104. This spherical wave is incident on a collimator lens 105 and is thus converted into a plane wave, and is then reflected through a right angle by a mirror 106, before being incident on a beam splitter 107 as reference light.

The other luminous flux divided off by the beam splitter 102 is reflected through a right angle by a mirror 108, and is then converged by a converging lens 109; a pinhole is not disposed at the convergent point of the converging lens 109. The luminous flux transmitted through the converging lens 109 is thus first converged and is then incident on a collimator lens 110 while diverging and is made into parallel light, without wavefront shaping being carried out, and is then incident on the beam splitter 107 as sample light.

The reference light and the sample light are combined at the beam splitter 107, whereby interfering light is obtained, and this interfering light is taken into an image pickup camera 112 via an image-forming lens 111. The wavefront measurement on the light beam is then carried out based on interference fringes picked up by the image pickup camera 112.

The pinhole described above has a function of forming an ideal spherical wave, and is such that the formed spherical wave is emitted to the rear of the pinhole. In contrast with this, there is also known an apparatus having a function of converting part of an incident luminous flux into an ideal spherical wave, and reflecting this spherical wave back in the opposite direction to the direction of incidence (hereinafter referred to as a 'reflection diffracting part'). Such a reflection diffracting part is also known as a reflection-type pinhole or the like, and ones in which a minute reflection region is formed on a glass substrate, or a minute reflection region is formed on the tip of a needle-shaped member (see Japanese Unexamined Patent Publication No. 2000-97612), ones in which a reflecting surface is disposed immediately behind an ordinary pinhole (see Japanese Unexamined Patent Publication No. S58-60590), and so on are known.

With a conventional Mach-Zehnder wavefront-measuring interferometer apparatus as described above, it is such that the optical elements such as beam splitters and mirrors are disposed symmetrically, and the two luminous fluxes that are made to interfere with one another pass through these optical elements one at a time symmetrically along the respective optical paths; such an interferometer apparatus thus has the characteristic feature that if the optical characteristics of the symmetrically disposed optical elements are made to be equal, then aberration and so on possessed by the respective optical elements will not be prone to having an adverse effect on the measurement results. Mach-Zehnder wavefront-measuring interferometer apparatuses are thus commonly used as highly versatile measurement apparatuses in wavefront measurements on light beams.

However, a Mach-Zehnder wavefront-measuring interferometer apparatus has many optical system components, and there are many places where adjustment must be carried out, and hence there is a problem of adjustment of the optical system being very difficult. Moreover, the optical path of the reference light and the optical path of the sample light must be spatially separated from one another, and hence there is a problem of the apparatus becoming large. Moreover, the constitution is such that the reference light and the sample light pass along separate optical paths, and hence there are problems such as the apparatus being susceptible to vibration, and installation of a phase shifting mechanism being difficult.

SUMMARY OF THE INVENTION

The present invention has been devised in view of the state of affairs described above; it is a first object of the present invention to provide a highly practical wavefront-measuring interferometer apparatus which has an optical system that has a simple constitution and is compact, and for which adjustment of the optical system can be carried out easily.

Moreover, hitherto there has been no measurement apparatus capable of simultaneously carrying out wavefront measurement on a light beam and light beam spot characteristic measurement. If these two types of measurement could be carried out simultaneously using a single measurement apparatus, then there would be many advantages, for example it would be possible to compare and analyze the results of the two types of measurement in real time, and moreover greatly reduce the measurement cost.

In view of the state of affairs described above, it is a second object of the present invention to provide a light beam measurement apparatus and method thereof enabling wavefront measurement and light beam spot characteristic measurement to be carried out simultaneously on a light beam.

A wavefront-measuring interferometer apparatus of the present invention for attaining the above first object is constituted as follows. That is, the wavefront-measuring interferometer apparatus according to the present invention comprises: a semi-transmitting/reflecting surface that reflects part of a light beam to be measured back in the opposite direction to the direction of incidence as a sample luminous flux; reference light producing means, which has a converging lens that converges a transmitted luminous flux transmitted through the semi-transmitting/reflecting surface, and a minute reflection diffracting part disposed at the convergent point of the converging lens, and is for converting part of the transmitted luminous flux incident thereon from the semi-transmitting/reflecting surface into a wavefront-shaped reference luminous flux, and outputting the reference luminous flux toward the semi-transmitting/reflecting surface; and an image-forming part that has a detection surface, and leads, to the detection surface, interfering light obtained by combining the reference luminous flux and the sample luminous flux, so as to form interference fringes on the detection surface; wherein the wavefront-measuring interferometer apparatus is constituted such as to carry out wavefront measurement on the light beam based on the interference fringes formed on the detection surface.

Moreover, the wavefront-measuring interferometer apparatus of the present invention may be constituted so as to further have optical path length adjusting means for adjusting the optical distance between the semi-transmitting/reflecting surface and the reference light producing means by moving at least one of the semi-transmitting/reflecting surface and the reference light producing means in the direction of the optical axis, and/or such that the reference light producing means holds a plurality of reflection diffracting parts having different sizes to one other, wherein any one of the reflection diffracting parts can be selected and disposed at the convergent point.

Note that the surrounding region around the reflection diffracting part is preferably constituted in a shape such that the transmitted luminous flux incident on the surrounding region via the converging lens can be suppressed from being reflected back toward the converging lens.

A light beam measurement apparatus of the present invention for attaining the above second object is constituted as follows. That is, the light beam measurement apparatus according to the present invention is a light beam measurement apparatus that can carry out both wavefront measurement on a light beam to be measured and spot characteristic measurement on the light beam, and comprises: a wavefront measurement part having sample/reference luminous flux dividing means for dividing the light beam into a sample luminous flux for wavefront measurement, and a reference luminous flux-producing luminous flux, reference light producing means for converting the reference luminous flux-producing luminous flux into a reference luminous flux by wavefront shaping, interference fringe producing means for making the sample luminous flux and the reference luminous flux interfere with one another so as to form interference fringes that hold wavefront information on the sample luminous flux, and a first light detector that is provided in the image plane of the interference fringes; and a spot characteristic measurement part having spot-producing luminous flux dividing means for dividing off, as a spot-producing luminous flux, part of the light beam before the light beam is incident on the sample/reference luminous flux dividing means, or part of the sample luminous flux after the sample luminous flux has been divided off by the sample/reference luminous flux dividing means, or part of the reference luminous flux-producing luminous flux before the reference luminous flux-producing luminous flux is subjected to the wavefront shaping, spot image producing means for forming a spot image from the spot-producing luminous flux divided off by the spot-producing luminous flux dividing means, and a second light detector that is provided in the image plane of the spot image.

The sample/reference luminous flux dividing means may be a semi-transmitting/reflecting surface that reflects part of the light beam incident thereon back in the opposite direction to the direction of incidence as the sample luminous flux, and transmits the remainder of the light beam as the reference luminous flux-producing luminous flux.

Moreover, the reference light producing means may be made to have a converging lens that converges the reference luminous flux-producing luminous flux, and a minute reflection diffracting part disposed at the convergent point of the converging lens, the reference light producing means is also made to convert part of the reference luminous flux-producing luminous flux incident thereon from the sample/reference luminous flux dividing means into the reference luminous flux by wavefront shaping, and output the reference luminous flux toward the sample/reference luminous flux dividing means.

Moreover, a light beam measurement apparatus according to the present invention comprises: luminous flux dividing means for dividing a light beam to be measured into two luminous fluxes; a semi-transmitting/reflecting surface that reflects part of one luminous flux out of the two luminous fluxes that have been divided by the luminous flux dividing means back in the opposite direction to the direction of incidence as a sample luminous flux; reference light producing means, which has a converging lens that converges a transmitted luminous flux transmitted through the semi-transmitting/reflecting surface, and a minute reflection diffracting part disposed at the convergent point of the converging lens, and is for converting part of the transmitted luminous flux incident thereon from the semi-transmitting/reflecting surface into a wavefront-shaped reference luminous flux, and outputting the reference luminous flux toward the semi-transmitting/ reflecting surface; a first image-forming part that has a first detection surface, and leads, to the first detection surface, interfering light obtained by combining the reference luminous flux and the sample luminous flux, so as to form interference fringes on the first detection surface; and a second image-forming part that has a second detection surface, and forms, on the second detection surface, a spot image of the other luminous flux out of the two luminous fluxes that have been divided by the luminous flux dividing means; wherein the light beam measurement apparatus is constituted so as to carry out wavefront measurement on the light beam based on the interference fringes formed on the first detection surface, and carry out light beam spot characteristic measurement based on the spot image formed on the second detection surface.

'Minute reflection diffracting part' in the above means may be a part whose size is set in accordance with the diffraction limit of the converged luminous flux condensed (converged) onto the reflection diffracting part (and is preferably made smaller than this diffraction limit), and that has a function of reflecting at least part of the converged luminous flux as a wavefront-shaped spherical wave. Such a reflection diffracting part may have any of various constitutions; examples of specific forms include one in which a minute reflecting region is formed on a substrate, one in which a minute reflection region is formed on the tip of a needle-shaped member, and one in which a reflecting surface is disposed immediately behind a pinhole.

Note that the surrounding region around the reflection diffracting part is preferably constituted in a shape such that the transmitted luminous flux incident on the surrounding region via the converging lens can be suppressed from being reflected back toward the converging lens.

Moreover, the light beam measurement apparatus of the present invention may be constituted such that the interfering light is led to the first detection surface via the luminous flux dividing means, and/or may further have optical path length adjusting means for adjusting the optical distance between the semi-transmitting/reflecting surface and the reference light producing means by moving at least one of the semi-transmitting/reflecting surface and the reference light producing means in the direction of the optical axis.

Moreover, the light beam measurement apparatus may further have light-shielding means for blocking off the optical path between the semi-transmitting/reflecting surface and the reference light producing means, and/or may be constituted such that the reflection diffracting part can be moved to a position away from the optical path, and/or may be constituted such that the reference light producing means holds a plurality of reflection diffracting parts having different sizes to one another, wherein any one of the reflection diffracting parts can be selected and disposed at the convergent point, and/or may further have a power meter that measures the optical intensity of the light beam emitted from the light source unit.

Moreover, the light beam measurement apparatus may further have first analyzing means for analyzing the interference fringes to obtain wavefront measurement results on the light beam, and second analyzing means for analyzing the spot image to obtain light beam spot characteristic measurement results on the light beam.

Moreover, a light beam measurement method of the present invention is a light beam measurement method that enables both wavefront measurement on a light beam to be measured and spot characteristic measurement on the light beam, and comprises: an interference fringe production procedure of dividing the light beam into a sample luminous flux for wavefront measurement, and a reference luminous flux-producing luminous flux, converting the reference luminous flux-producing luminous flux into a reference luminous flux by wavefront shaping, and then making the sample luminous flux and the reference luminous flux interfere with one another so as to form interference fringes that hold wavefront information on the sample luminous flux; a spot image production procedure of dividing off, as a spot-producing luminous flux, part of the light beam before the light beam is divided into the sample luminous flux and the reference luminous flux-producing luminous flux, or part of the sample luminous flux after the sample luminous flux has been divided off, or part of the reference luminous flux-producing luminous flux before the reference luminous flux-producing luminous flux is subjected to the wavefront shaping, and forming a spot image from the spot-producing luminous flux; a first analysis procedure of analyzing the interference fringes to obtain wavefront measurement results on the light beam; and a second analysis procedure of analyzing the spot image to obtain light beam spot characteristic measurement results on the light beam.

DESCRIPTION OF THE PREFERRED EMBODIMENTS

<Wavefront-Measuring Interferometer Apparatus>

Figure 1:
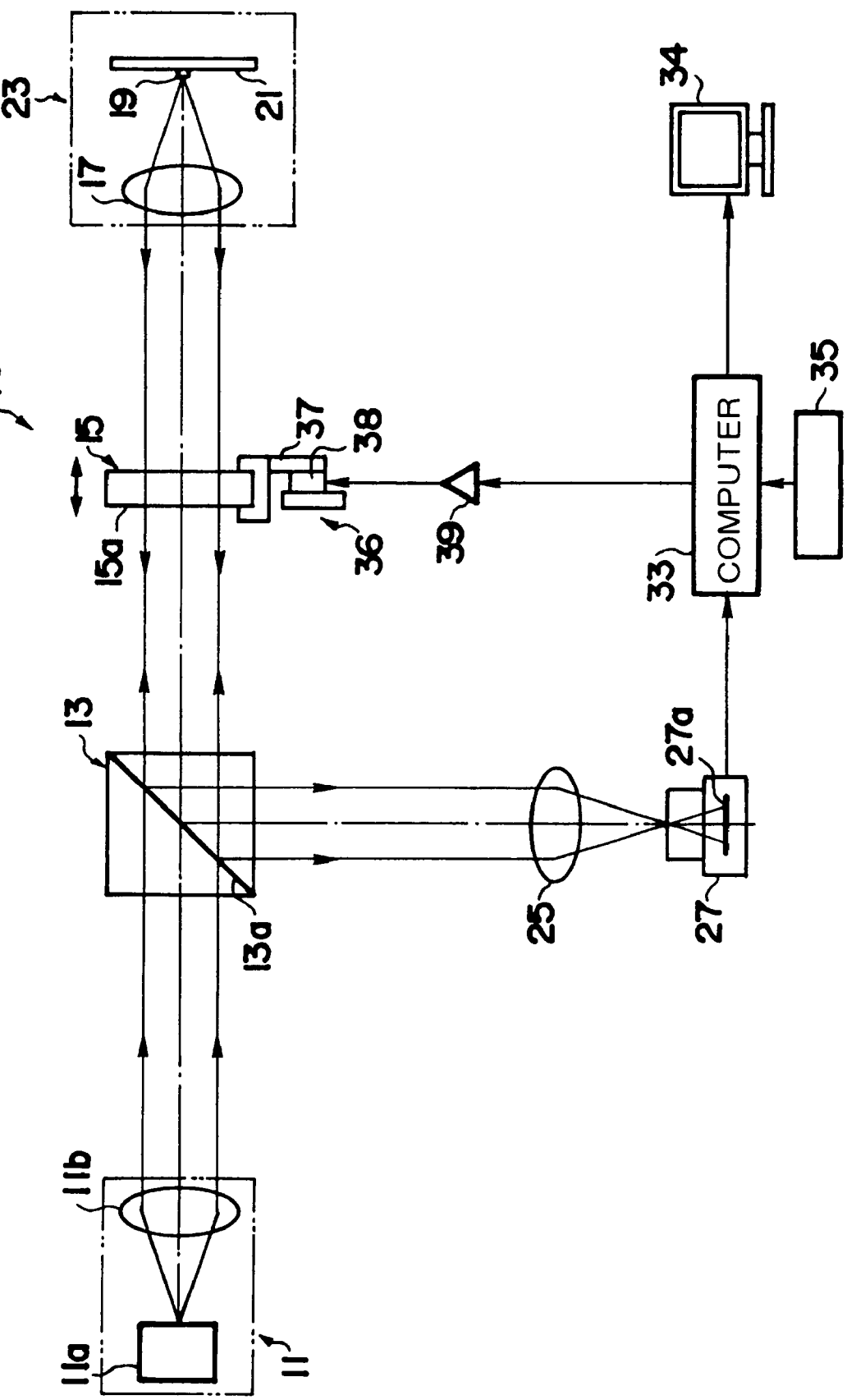
FIG. 1 is a drawing showing an embodiment of a wavefront-measuring interferometer apparatus according to the present invention.

Following is a detailed description of an embodiment of a wavefront-measuring interferometer apparatus according to the present invention, with reference to the drawings. FIG. 1 is a schematic drawing of the constitution of a wavefront-measuring interferometer apparatus according to an embodiment of the present invention.

The wavefront-measuring interferometer apparatus 10 shown in FIG. 1 carries out wavefront measurement on a light beam emitted from a light source unit 11, and has a beam splitter 13, a semi-transmitting reflecting plate 15, and reference light producing means 23, which are disposed on an optical path extending from the substrate 11 toward the right in the drawing, and an image-forming lens 25, and an image pickup camera 27, which are disposed below the beam splitter 13 in the drawing. Moreover, the wavefront-measuring interferometer apparatus 10 further has a computer 33 that carries out various types of analysis based on image signals from the image pickup camera 27, a display apparatus 34 that displays images and analysis results from the computer 33, and an input apparatus 35 comprising a keyboard, a mouse and so on. Note that in the present embodiment, the image-forming part of the present invention is constituted from the beam splitter 13, the image-forming lens 25 and the image pickup camera 27.

Moreover, in the present embodiment, the light source unit 11 comprises a light source main body 11a comprising a solid state laser, a semiconductor laser, a gas laser or the like, and a beam optical system 11b comprising an appropriate combination of elements selected from beam expanders, collimator lenses, cylindrical lenses and so on (for elements that can be used alone, this includes the case of using such an element alone), and is constituted such as to emit a single longitudinal mode or multiple longitudinal mode light beam as parallel light toward the right in the drawing. Note that the light source main body 11a used may, for example, be one constituted such as to output laser light from a solid state laser or the like via an optical fiber. Moreover, the light source unit 11 is one that can be used as a laser light-outputting apparatus incorporated into any of various apparatuses, and is not a constituent element of the wavefront-measuring interferometer apparatus 10.

Following is a detailed description of the constituent elements of the wavefront-measuring interferometer apparatus 10 described above. The semi-transmitting reflecting plate 15 is held by a fringe scanning adapter 36 as optical path length adjusting means. This fringe scanning adapter 36 comprises a holder 37 and a piezoelectric element 38, and is constituted such that the semi-transmitting reflecting plate 15 is moved in the direction of the optical axis by driving the piezoelectric element 38, thus adjusting the optical distance between the semi-transmitting reflecting plate 15 and the reference light producing means 23. The driving of the piezoelectric element 38 is controlled by the computer 33 via a driver 39.

Moreover, the reference light producing means 23 has a converging lens 17 that converges a parallel luminous flux incident thereon from the left in the drawing to a point, and a reflection diffracting part 19 that is disposed at the convergent point of the converging lens 17. The reflection diffracting part 19 comprises, for example, a metal film of gold, aluminum, chromium or the like formed by vapor deposition or the like on a substrate 21, and is constituted such that the size of the reflection diffracting part 19 is smaller than the diffraction limit of the converged luminous flux incident thereon.

Following is a description of the operation of the wavefront-measuring interferometer apparatus 10 during measurement. Part of a light beam emitted toward the right in the drawing from the light source unit 11 goes toward the semi-transmitting reflecting plate 15 via the beam splitter 13, and at a semi-transmitting reflecting surface 15a of the semi-transmitting reflecting plate 15 is divided into a sample luminous flux that is reflected back in the opposite direction to the direction of incidence, and a transmitted luminous flux that is transmitted through the semi-transmitting reflecting plate 15 and goes toward the reference light producing means 23; the transmitted luminous flux is then incident on the converging lens 17 of the reference light producing means 23.

The transmitted luminous flux incident on the converging lens 17 is converged by the converging lens 17, and is then incident on the reflection diffracting part 19 disposed at the convergent point of the converging lens 17. Part of the transmitted luminous flux incident on the reflection diffracting part 19 is converted into a wavefront-shaped spherical wave at the reflection diffracting part 19, and is then reflected back toward the converging lens 17. The spherical wave is converted into a plane wave at the converging lens 17, and is then outputted toward the semi-transmitting reflecting plate 15 as a reference luminous flux.

The reference luminous flux is transmitted through the semi-transmitting reflecting plate 15, and is combined with the sample luminous flux that was reflected at the semi-transmitting reflecting surface 15a, whereby interfering light is obtained. This interfering light is incident on the image-forming lens 25 via the beam splitter 13, and is taken into the image pickup camera 27 via the image-forming lens 25. The image pickup camera 27 has a detection surface 27a that is constituted from solid state imaging elements such as CCD's or CMOS's, and is constituted so as to pick up interference fringes formed on the detection surface 27a via the image-forming lens 25. Image information on the picked up interference fringes is inputted into the computer 33, and wavefront measurement on the light beam is carried out based on this image information. Note that more detailed wavefront measurement results can be obtained by carrying out so-called fringe scanning measurement, i.e. by picking up the interference fringes while slightly moving the semi-transmitting reflecting surface 15a in the direction of the optical axis using the fringe scanning adapter 36 and hence varying the optical path length difference between the reference luminous flux and the sample luminous flux a little at a time.

As described above, according to the wavefront-measuring interferometer apparatus 10 of the present embodiment, the distinct functions that have been borne by two respective beam splitters in a conventional Mach-Zehnder interferometer apparatus, i.e. the function of dividing the light beam from the light source unit into reference light and sample light, and the function of combining the reference light and the sample light, are borne by one semi-transmitting reflecting surface, and hence the optical system can be made simple and compact, and moreover adjustment of the optical system can also be carried out easily. Wavefront measurement can thus easily be carried out on coherent light such as laser light emitted from the light source unit 11, and moreover it is easy to secure the space for installing the apparatus.

Moreover, hitherto it has been difficult to carry out wavefront measurement on multiple longitudinal mode laser light having a very short coherence length using a conventional wavefront-measuring interferometer apparatus for which adjustment of the optical system is difficult, this being because interference fringes with good contrast cannot be obtained unless the optical path length difference between the reference luminous flux and the sample luminous flux is adjusted accurately. In contrast with this, with the wavefront-measuring interferometer apparatus 10 described above, adjustment of the optical path length difference between the two luminous fluxes can be carried out easily by changing the position of the semi-transmitting reflecting surface 15a using the fringe scanning adapter 36. Wavefront measurement can thus be carried out accurately even on multiple longitudinal mode laser light.

Note that with the form shown in FIG. 1, the constitution is such that the semi-transmitting reflecting plate 15 and the reference light producing means 23 are disposed to the right of the beam splitter 13 in the drawing, and out of the light beam incident on the beam splitter 13 from the light source unit 11, the luminous flux that is transmitted through the dividing surface 13a goes toward the semi-transmitting reflecting surface 15a; however, the constitution may instead be made to be such that the semi-transmitting reflecting plate 15 and the reference light producing means 23 are disposed above the beam splitter 13 in the drawing, and out of the light beam incident on the beam splitter 13 from the light source unit 11, the luminous flux that is reflected through a right angle at the dividing surface 13a goes toward the semi-transmitting reflecting surface 15a.

First Embodiment

<Light Beam Measurement Apparatus>

Figure 2:
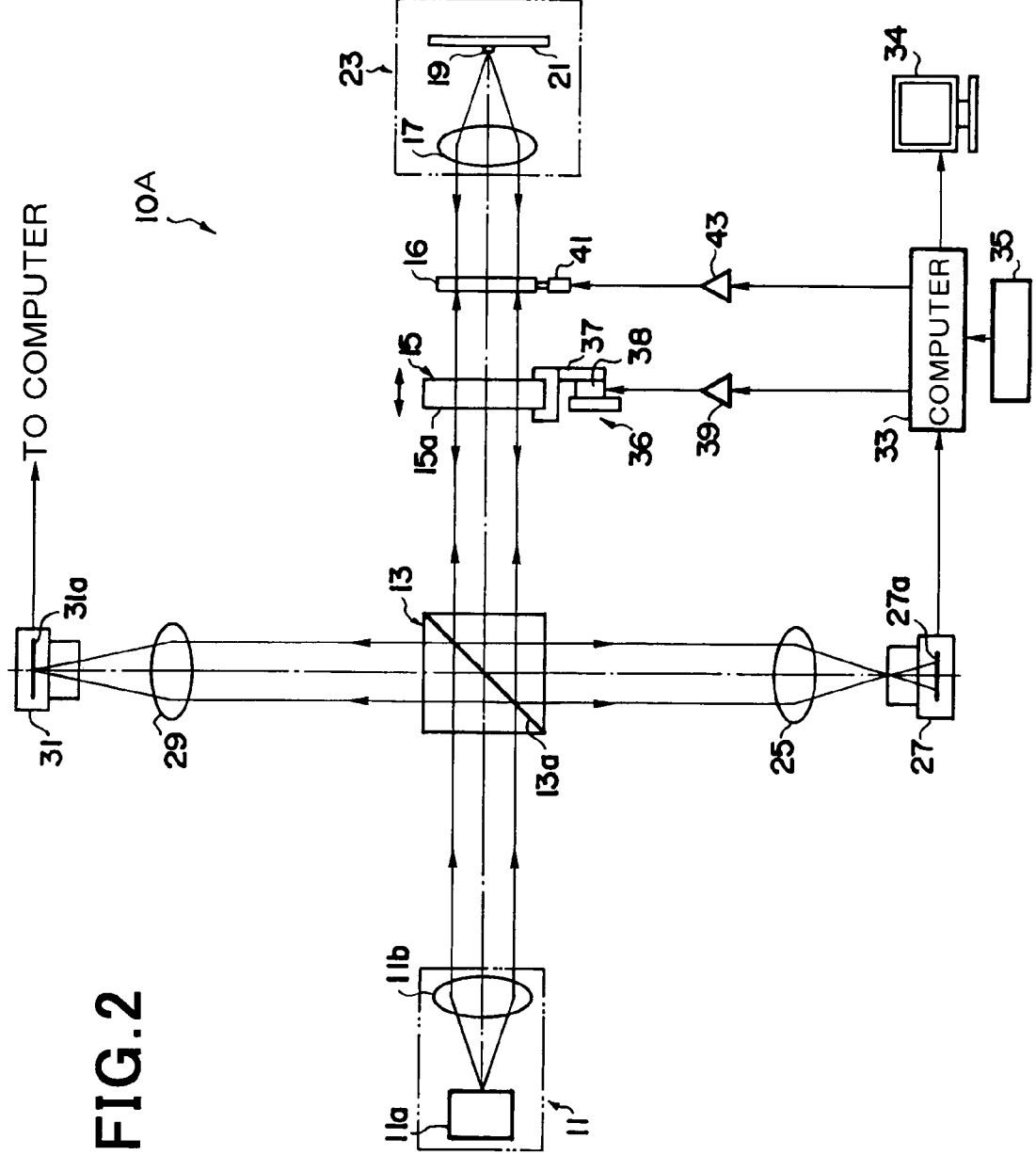
FIG. 2 is a drawing showing a first embodiment of a light beam measurement apparatus according to the present invention.

Next, an embodiment of a light beam measurement apparatus according to the present invention will be described in detail, with reference to the drawings. FIG. 2 is a schematic drawing of the constitution of a light beam measurement apparatus according to a first embodiment of the present invention.

The light beam measurement apparatus 10A shown in FIG. 2 is a light beam measurement apparatus that can carry out both wavefront measurement on a light beam to be measured and spot characteristic measurement on the light beam, and has a wavefront measurement part and a spot characteristic measurement part.

The wavefront measurement part has sample/reference luminous flux dividing means (15) that divides a light beam emitted from a light source unit 11 into two luminous fluxes, i.e. a sample luminous flux for wavefront measurement, and a reference luminous flux-producing luminous flux, reference light producing means (23) for converting the reference luminous flux-producing luminous flux into a reference luminous flux by wavefront shaping, interference fringe producing means (25) for making the sample luminous flux and the reference luminous flux interfere with one another so as to form interference fringes that hold wavefront information on the sample luminous flux, and a first light detector (27a) that is provided in the image plane of the interference fringes.

The spot characteristic measurement part, on the other hand, has spot-producing luminous flux dividing means (13) for dividing off part of the light beam before the light beam is incident on the sample/reference luminous flux dividing means (15), this part of the light beam being taken as a spot-producing luminous flux, spot image producing means (29) for forming a spot image from the spot-producing luminous flux divided off by the spot-producing luminous flux dividing means (13), and a second light detector (31a) that is provided in the image plane of the spot image.

More specifically, the light beam measurement apparatus 10A has a beam splitter 13 as the luminous flux dividing means, a semi-transmitting reflecting plate 15 as the sample/reference luminous flux dividing means, a light-shielding plate 16, and reference light producing means 23, which are disposed on an optical path extending from a light source unit 11 toward the right in the drawing, a first image-forming lens 25 and a first image pickup camera 27, which are disposed below the beam splitter 13 in the drawing, and a second image-forming lens 29 and a second image pickup camera 31, which are disposed above the beam splitter 13 in the drawing. Moreover, the light beam measurement apparatus 10A further has a computer 33 that carries out various types of analysis based on image signals from the first and second image pickup cameras 27 and 31, a display apparatus 34 that displays images and analysis results from the computer 33, and an input apparatus 35 comprising a keyboard, a mouse and so on. The computer 33 has first analyzing means for analyzing the interference fringes so as to obtain wavefront measurement results for the light beam, and second analyzing means for analyzing the spot image so as to obtain light beam spot characteristic measurement results for the light beam, these analyzing means being in the form of a program stored in a memory or the like, operational circuitry for executing the program, and so on.

Note that in the present embodiment, a first image-forming part is constituted from the beam splitter 13, the first image-forming lens 25 and the first image pickup camera 27, and a second image-forming part is constituted from the beam splitter 13, the second image-forming lens 29 and the second image pickup camera 31.

Moreover, in the light beam measurement apparatus 10A shown in FIG. 2, constituent elements common with the wavefront-measuring interferometer apparatus 10 shown in FIG. 1 are represented by the same reference numerals as in FIG. 1, and to avoid repetition detailed description of these will be omitted in the following, but rather only differences will be described in detail.

In the present embodiment, the light source unit 11 is constituted as for that shown in FIG. 1, and moreover as for the wavefront-measuring interferometer apparatus 10 described above, this light source unit 11 is one that can be used as a laser light-outputting apparatus incorporated into any of various apparatuses, and is not a constituent element of the light beam measurement apparatus 10A.

The light-shielding plate 16 comprises an openable/closable shutter or the like, and is constituted so as to block off the optical path between the semi-transmitting reflecting plate 15 and the reference light producing means 23 during adjustment of the optical system, and open up this optical path during measurement. The opening/closing of the light-shielding plate 16 is carried out using an electric motor 41, the driving of this electric motor 41 being controlled by the computer 33 via a driver 43.

Following is a description of the operation of the light beam measurement apparatus 10A during measurement. A light beam emitted toward the right in the drawing from the light source unit 11 is divided at a dividing surface 13a of the beam splitter 13 into two luminous fluxes, i.e. a luminous flux that goes toward the semi-transmitting reflecting plate 15, and a luminous flux that goes toward the second image-forming lens 29 (a spot-producing luminous flux). Out of the two luminous fluxes, the luminous flux that goes toward the semi-transmitting reflecting plate 15 is divided at the semi-transmitting reflecting surface 15a of the semi-transmitting reflecting plate 15 into a sample luminous flux that is reflected back in the opposite direction to the direction of incidence, and a transmitted luminous flux (reference luminous flux-producing luminous flux) that is transmitted through the semi-transmitting reflecting plate 15 and goes toward the reference light producing means 23. Note that because the light-shielding plate 16 is opened up during measurement, the transmitted luminous flux is not blocked by the light-shielding plate 16, but rather is incident on a converging lens 17 of the reference light producing means 23.

The transmitted luminous flux incident on the converging lens 17 is converged by the converging lens 17, and is then incident on a reflection diffracting part 19 disposed at the convergent point of the converging lens 17. Part of the transmitted luminous flux incident on the reflection diffracting part 19 is converted into a wavefront-shaped spherical wave at the reflection diffracting part 19, and is then reflected back toward the converging lens 17. The spherical wave is converted into a plane wave at the converging lens 17, and is then outputted toward the semi-transmitting reflecting plate 15 as a reference luminous flux.

The reference luminous flux is transmitted through the semi-transmitting reflecting plate 15, and is combined with the sample luminous flux that was reflected at the semi-transmitting reflecting surface 15a, whereby interfering light is obtained. The interfering light is incident on the first image-forming lens 25 via the beam splitter 13, and the interfering light passes through the first image-forming lens 25, and interference fringes are formed on the first detection surface 27a in the first image pickup camera 27, and thus picked up. Image information on the picked up interference fringes is inputted into the computer 33, and wavefront measurement on the light beam is carried out based on this image information.

On the other hand, out of the two luminous fluxes divided of by the beam splitter 13, the luminous flux outputted toward the second image-forming lens 29 is condensed onto a second detection surface 31a (constituted, for example, from solid state imaging elements such as CCD's or CMOS's) in the second image pickup camera 31 via the second image-forming lens 29, thus forming a spot image of the light beam on the second detection surface 31a. The second image pickup camera 31 is constituted such as to pick up the formed spot image, and output image information thereon to the computer 33. Measurement of various characteristics such as the intensity distribution or half width, or the cross-sectional shape or brightness distribution, of the light beam spot is then carried out based on the image information for the spot image inputted into the computer 33.

Adjustment of the optical system in the light beam measurement apparatus 10A is first carried out in a state in which the optical path between the semi-transmitting reflecting plate 15 and the reference light producing means 23 is blocked off by the light-shielding plate 16. In this state, adjustment of the optical members disposed along the optical path from the light beam being emitted from the light source unit 11 to the second image pickup camera 31 via the beam splitter 13, and adjustment of the optical members disposed along the optical path from the light source unit 11 via the beam splitter 13 to the semi-transmitting reflecting surface 15a, and then after being reflected at the semi-transmitting reflecting surface 15a, back via the beam splitter 13 to the first image pickup camera 27, are carried out. After these adjustments, the light-shielding plate 16 is opened up, and adjustment of the reference light producing means 23 is carried out.

As described above, according to the light beam measurement apparatus 10A according to the first embodiment, wavefront measurement and light beam spot characteristic measurement can be carried out simultaneously on the light beam emitted from the light source unit 11. Moreover, a Fizeau-type optical system layout is used, and hence the constitution is simple and compact, and moreover adjustment of the optical system can be carried out easily.

Note that with the form shown in FIG. 2, the semi-transmitting reflecting plate 15, the light-shielding plate 16 and the reference light producing means 23 are disposed to the right of the beam splitter 13 in the drawing, and the second image-forming lens 29 and the second image pickup camera 31 are disposed above the beam splitter 13 in the drawing; however, these positions may be interchanged. That is, it may be made to be such that the second image-forming lens 29 and the second image pickup camera 31 are disposed to the right of the beam splitter 13, and the semi-transmitting reflecting plate 15, the light-shielding plate 16 and the reference light producing means 23 are disposed above the beam splitter 13.

Moreover, with the form shown in FIG. 2, the constitution is such that the interfering light returning from the semi-transmitting reflecting plate 15 side is led to the first image-forming lens 25 via the beam splitter 13; however, the constitution may instead be made to be such that another beam splitter is disposed between the beam splitter 13 and the semi-transmitting reflecting plate 15, and the interfering light returning from the semi-transmitting reflecting plate 15 side is led to the first image-forming lens 25 via this other beam splitter.

Moreover, with the form shown in FIG. 2, there is provided a light-shielding plate 16 that blocks off the optical path between the semi-transmitting reflecting plate 15 and the reference light producing means 23 so that a luminous flux does not return from the reference light producing means 23 to the semi-transmitting reflecting plate 15 when adjustment of the optical system is being carried out; however, instead of providing such a light-shielding plate, a constitution may be adopted in which the reflection diffracting part can be moved (or tilted) to a position away from the optical path, so that a luminous flux can be prevented from returning from the reference light producing means 23 to the semi-transmitting reflecting plate 15 by moving the reflection diffracting part 19 to a position away from the optical path. Examples of forms in which the reflection diffracting part 19 can be moved to a position away from the optical path include a form in which the whole of the reference light producing means 23 is moved out of the optical path, and a form in which only the reflection diffracting part 19 is moved out of the optical path; in the case of changing the reflection diffracting part 19 to the form shown in FIG. 6 (described in detail later), the reflection diffracting parts 19A to 19D can easily be moved out of the optical path by rotating the substrate 21A.

Second Embodiment

<Light Beam Measurement Apparatus>

Figure 3:
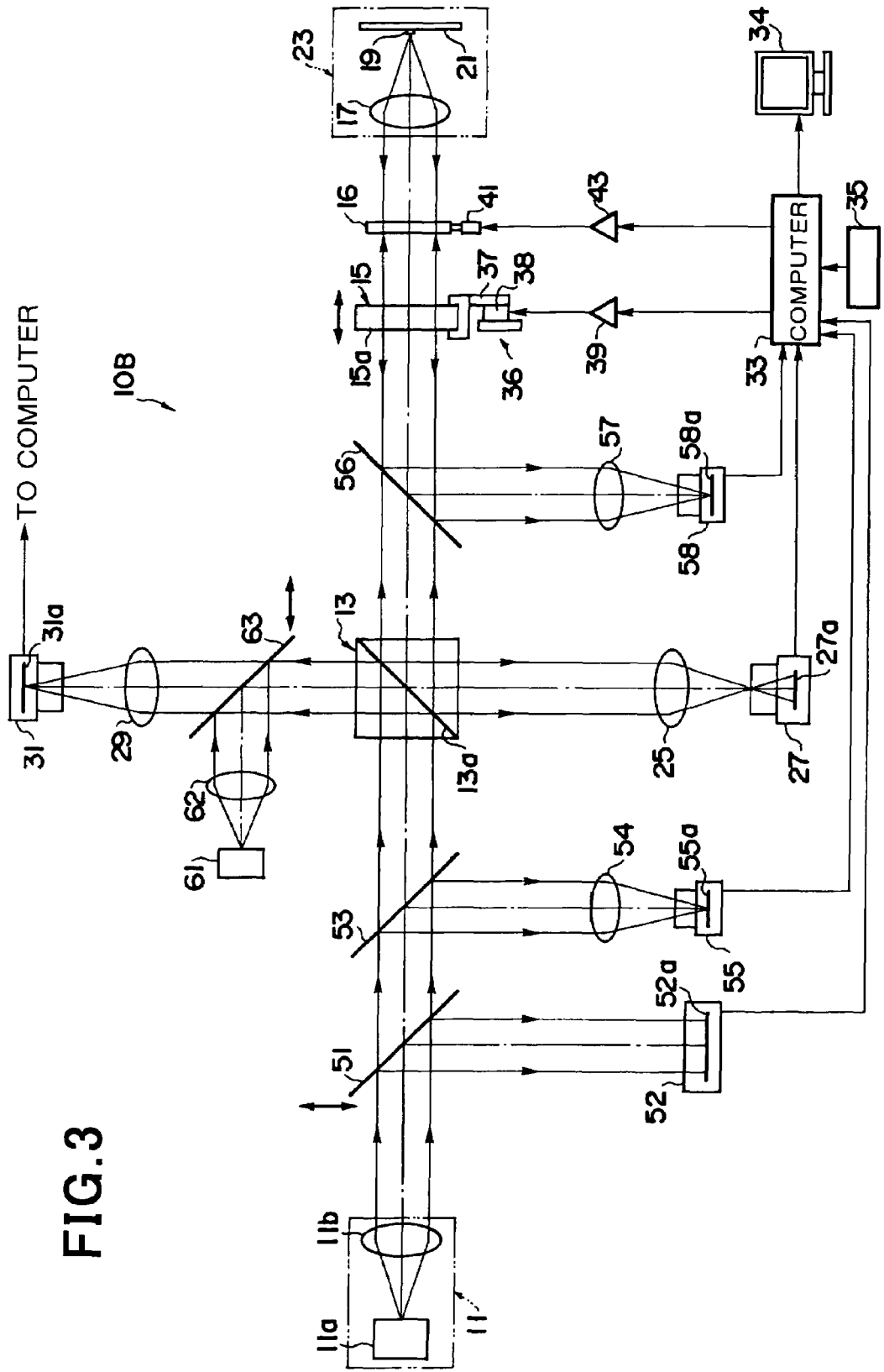
FIG. 3 is a drawing showing a second embodiment of the light beam measurement apparatus according to the present invention.

Next, a description will be given of a second embodiment of the light beam measurement apparatus according to the present invention. FIG. 3 is a schematic drawing of the constitution of the light beam measurement apparatus 10B according to the second embodiment of the present invention. In the light beam measurement apparatus 10B shown in FIG. 3, constituent elements common with the light beam measurement apparatus 10A shown in FIG. 2 are represented by the same reference numerals as in FIG. 2, and to avoid repetition detailed description of these will be omitted in the following, but rather only differences will be described in detail.

In addition to the constituent elements of the light beam measurement apparatus 10A shown in FIG. 2, the light beam measurement apparatus 10B shown in FIG. 3 also has the following constituent elements. That is, the light beam measurement apparatus 10B shown in FIG. 3 has a reflecting mirror 51 that is disposed in the optical path between the light source unit 11 and the beam splitter 13 when measuring the optical intensity of the light beam emitted from the light source unit 11, and reflects the light beam through a right angle so as to lead the light beam downward in the drawing while maintaining the parallel luminous flux state thereof, and a power meter 52 for measuring the optical intensity of the light beam from the reflecting mirror 51. The power meter 52 has a light-detecting surface 52a, and is constituted so as to measure the intensity of the light beam that is incident in an approximately parallel luminous flux state on the light-detecting surface 52a, and output the resulting measurement information to the computer 33. Note that a beam expander may be provided in the optical path between the reflecting mirror 51 and the power meter 52, so that the diameter of the parallel luminous flux incident on the power meter 52 can be changed as required. Moreover, the reflecting mirror 51 is disposed in the optical path only when measuring the optical intensity of the light beam, and is constituted so as to be withdrawn away from the optical path ordinarily, i.e. during light beam spot characteristic measurement or wavefront measurement on the light beam.

Moreover, the light beam measurement apparatus 10B has a beam splitter 53 that is disposed between the light source unit 11 and the beam splitter 13 and reflects part of the light beam emitted from the light source unit 11 through a right angle so as to lead the light beam downward in the drawing, an image-forming lens 54 for alignment that is disposed in the optical path of the light beam led from the beam splitter 53, and an image pickup camera 55 for alignment that is similarly disposed in this optical path. The image-forming lens 54 condenses the light beam incident thereon onto a detection surface 55a (constituted, for example, from solid state imaging elements such as CCD's or CMOS's) in the image pickup camera 55, thus forming a spot image of the light beam on the detection surface 55a. The image pickup camera 55 is constituted such as to pick up the formed spot image, and output image information thereon to the computer 33.

The spot image picked up by the image pickup camera 55 is used for aligning the tilt and so on of the light source unit 11. That is, alignment adjustment of the light source unit 11 is carried out based on information on the position of the spot image on the detection surface 55a inputted into the computer 33.

Moreover, the light beam measurement apparatus 10B further has a beam splitter 56 that is disposed between the beam splitter 13 and the semi-transmitting reflecting plate 15 and reflects part of the light beam outputted from the semi-transmitting reflecting surface 15a through a right angle so as to lead this part of the light beam downward in the drawing, an image-forming lens 57 for alignment that is disposed in the optical path of the light beam led from the beam splitter 56, and an image pickup camera 58 for alignment that is similarly disposed in this optical path. The image-forming lens 57 condenses the light beam incident thereon onto a detection surface 58a (constituted, for example, from solid state imaging elements such as CCD's or CMOS's) in the image pickup camera 58, thus forming a spot image of the light beam on the detection surface 58a. The image pickup camera 58 is constituted such as to pick up the formed spot image, and output image information thereon to the computer 33.

The spot image picked up by the image pickup camera 58 is used for aligning the tilt and so on of the semi-transmitting reflecting plate 15 and the reference light producing means 23. That is, alignment adjustment of the semi-transmitting reflecting plate 15 and the reference light producing means 23 is carried out based on information on the position of the spot image on the detection surface 58a inputted into the computer 33.

This alignment adjustment is first carried out in a state in which the optical path between the semi-transmitting reflecting plate 15 and the reference light producing means 23 is blocked off by the light-shielding plate 16. In this state, alignment adjustment of the semi-transmitting reflecting plate 15 is carried out, and then after this adjustment, the light-shielding plate 16 is opened up, and alignment adjustment of the reference light producing means 23 is carried out.

Moreover, the light beam measurement apparatus 10B further has an alignment light source 61 that is positioned above the beam splitter 13 in the drawing and outputs a luminous flux for alignment, a collimator lens 62 that collimates the divergent luminous flux outputted toward the right in the drawing from the alignment light source 61, and a reflecting mirror 63 that is disposed in the optical path between the beam splitter 13 and the second image-forming lens 29 during alignment of a parallel plate-like optical element described below, and reflects the parallel luminous flux from the collimator lens 62 through a right angle so as to lead the light beam downward in the drawing to the beam splitter 13.

In the case that a parallel plate-like optical element (e.g. a cover glass or any of various filters; omitted from the drawing) is disposed between the light source unit 11 and the beam splitter 53, the alignment light source 61 is used during alignment adjustment of the tilt and so on of this optical element. That is, during alignment adjustment of this optical element, the reflecting mirror 63 is disposed in the optical path between the beam splitter 13 and the second image-forming lens 29, and the luminous flux for alignment outputted from the alignment light source 61 is led to the beam splitter 13 via the collimator lens 62 and the reflecting mirror 63. Part of the parallel luminous flux for alignment that has been led to the beam splitter 13 is reflected through a right angle toward the left in the drawing at the dividing surface 13a of the beam splitter 13, and is thus led to the optical element.

Part of this parallel luminous flux for alignment that has been led to the optical element is reflected at the optical element, and part of this reflected luminous flux is reflected through a right angle downward in the drawing by the beam splitter 53, and is then further condensed onto the detection surface 55a in the image pickup camera 55 by the aligning image-forming lens 54, thus forming a spot image on the detection surface 55a. This spot image is picked up by the image pickup camera 55, and image information thereon is outputted to the computer 33. Alignment adjustment of the optical element is then carried out based on information on the position of the spot image on the detection surface 55a inputted into the computer 33.

Figure 4:
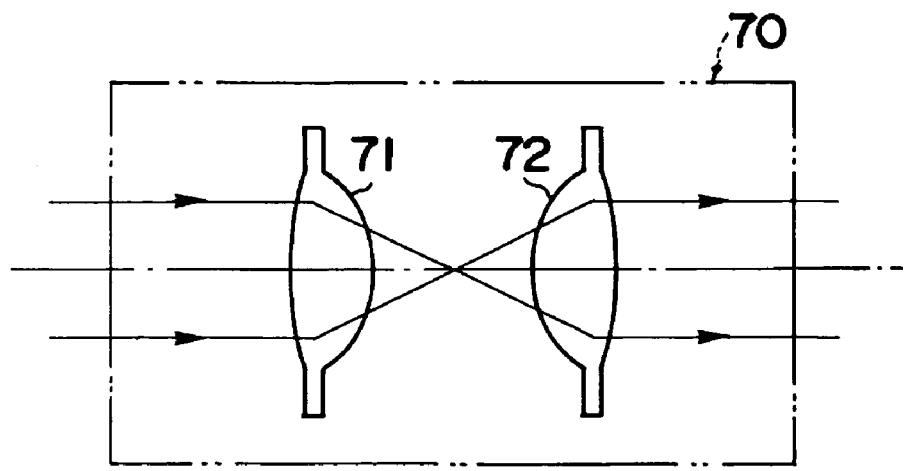
FIG. 4 is a drawing showing a measurement unit for optical transmissivity measurement.

Note that the reflecting mirror 51 and the power meter 52 described earlier can also be used in the case of measuring the optical transmissivity of a prescribed condensing lens (e.g. a light pickup lens), or the optical intensity of a light beam outputted via such a condensing lens. FIG. 4 shows a measurement unit 70 used for measuring the transmissivity of such a light pickup lens.

The measurement unit 70 shown in FIG. 4 has a constitution in which a first lens 71 for picking up light to be measured, and a second lens (having a known optical transmissivity) 72 that collimates a light beam incident on the first lens 71 from the left in the drawing after this light beam has been converged and then diverged by the first lens 71, are held with a prescribed distance therebetween. This measurement unit 70 is disposed in the optical path between the light source unit 11 and the reflecting mirror 51 in FIG. 3 when measuring the optical transmissivity of the first lens 71 or the optical intensity of the light beam outputted via the first lens 71 using an optical transmissivity measurement method proposed by the present applicants (see the specification of Japanese Patent Application No. 2004-379449, and the specification of Japanese Patent Application No. 2004-379450).

That is, in a state in which the measurement unit 70 is disposed in the optical path between the light source unit 11 and the reflecting mirror 51 shown in FIG. 3, maximum light quantity data for the light beam outputted from the light source unit 11 via the measurement unit 70 is obtained by the power meter 52, and by comparing this with the light quantity data for the light beam from the light source unit 11 measured without the measurement unit 70 being disposed in the optical path, and calculating, the optical transmissivity of the first lens 71 and the optical intensity of the light beam when outputted via the first lens 71 only can be determined (for details, see the specifications of the above-mentioned patent applications).

Moreover, in the case that the optical transmissivity of the second lens is not known, it is possible to add a third lens to the measurement-subjected lenses in addition to the first and second lenses 71 and 72, constitute three different lens pairs using these three lenses, obtain maximum light quantity data for these lens pairs in order, and solve a set of three simultaneous equations containing the optical transmissivities of the lenses as unknowns, and thus determine the optical transmissivities of the measurement-subjected lenses.

Note that when measuring the optical transmissivity or the like of the first lens 71, instead of the sample light source unit 11 shown in FIG. 3, it is preferable to use a measurement reference light source (omitted from the drawing) that can output a light beam having a higher wavefront accuracy.

As described above, according to the light beam measurement apparatus 10B according to the second embodiment, wavefront measurement and light beam spot characteristic measurement can be carried out simultaneously on the light beam emitted from the light source unit 11, and moreover measurement of the optical intensity of the light beam emitted from the light source unit 11, measurement of the optical transmissivity or the like of a light pickup lens, or the like can also be carried out. Moreover, an optical system for alignment is provided, and hence adjustment of the system as a whole can be carried out more easily.

Note that with the form shown in FIG. 3, it has been made to be such that before being incident on the semi-transmitting reflecting plate 15 (sample/reference luminous flux dividing means), part of the light beam is divided of as a spot-producing luminous flux by the beam splitter 13 (luminous flux dividing means); however, it may be made to be such that part of the sample luminous flux divided off by the semi-transmitting reflecting plate 15 (sample/reference luminous flux dividing means) is divided off as a spot-producing luminous flux by the beam splitter 56, or such that another beam splitter is installed between the semi-transmitting reflecting plate 15 and the reference light producing means 23, and this beam splitter divides off part of the reference luminous flux-producing luminous flux as a spot-producing luminous flux before the wavefront shaping.

<Light Beam Measurement Method>

Following is a description of a light beam measurement method according to an embodiment of the present invention. This light beam measurement method can be carried out using the light beam measurement apparatus 10A or the light beam measurement apparatus 10B described above.

That is, first the light beam to be measured (the light beam emitted from the light source unit 11) is divided into two luminous fluxes, i.e. a sample luminous flux for wavefront measurement, and a reference luminous flux-producing luminous flux, at the semi-transmitting reflecting surface 15a, the divided off reference luminous flux-producing luminous flux is converted into a reference luminous flux by wavefront shaping by the reference light producing means 23, and then the sample luminous flux and the reference luminous flux are made to interfere with one another, and an image of the resulting interference fringes, which hold wavefront information on the sample luminous flux, is formed on the first detection surface 27a in the first image pickup camera 27 (interference fringe production procedure).

On the other hand, before being divided into the sample luminous flux and the reference luminous flux-producing luminous flux, part of the light beam is divided off as a spot-producing luminous flux by the beam splitter 13, and an image of the divided off spot-producing luminous flux is formed as a spot image on the second detection surface 31a in the second image pickup camera 31 (spot image production procedure).

Moreover, in the computer 33, the interference fringes are analyzed to obtain wavefront measurement results on the light beam (first analysis procedure), and the spot image is analyzed to obtain light beam spot characteristic measurement results on the light beam (second analysis procedure).

<Modification of Form>

With each of the light beam measurement apparatus 10A shown in FIG. 2 and the light beam measurement apparatus 10B shown in FIG. 3, the optical system layout for obtaining the interference fringes has been made to be Fizeau-type, but instead of Fizeau-type, a Michelson-type optical system layout may be used. In this case, there will be a decline in the characteristic features for the case of using a Fizeau-type optical system layout described earlier, i.e. the optical system having a simple constitution and being compact, and adjustment of the optical system being easy, but there will be an advantage in that the optical path lengths of the sample luminous flux and the reference luminous flux for obtaining the interference fringes can be made to be approximately equal to one another, and hence measurement becomes possible even in the case that the light beam targeted for the wavefront measurement is a low-coherence luminous flux.

Moreover, by providing the wavefront-measuring interferometer apparatus 10 shown in FIG. 1 with the reflecting mirror 51 and the power meter 52 of the light beam measurement apparatus 10B shown in FIG. 3, the wavefront-measuring interferometer apparatus 10 can be constituted so as to be able to carry out measurement of the optical intensity of the light beam and so on. In this case, the reflecting mirror 51 is preferably disposed withdrawably in the optical path between the light source unit 11 and the beam splitter 13. Furthermore, by using the measurement unit 70 shown in FIG. 4, the wavefront-measuring interferometer apparatus 10 shown in FIG. 1 can be constituted so as to be able to carry out measurement of the optical transmissivity or the like of a light pickup lens.

Moreover, the form of the reflection diffracting part 19 that is used in each of the wavefront-measuring interferometer apparatus 10 shown in FIG. 1 and the light beam measurement apparatuses 10A and 10B shown in FIGS. 2 and 3 can be variously modified.

Figure 5:
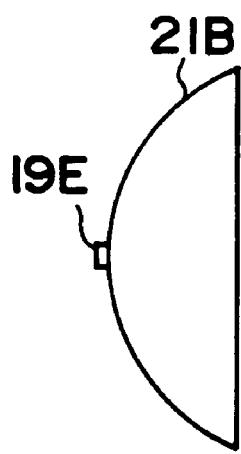
FIG. 5 is a drawing showing a variation of a reflection diffracting part.
Figure 6:
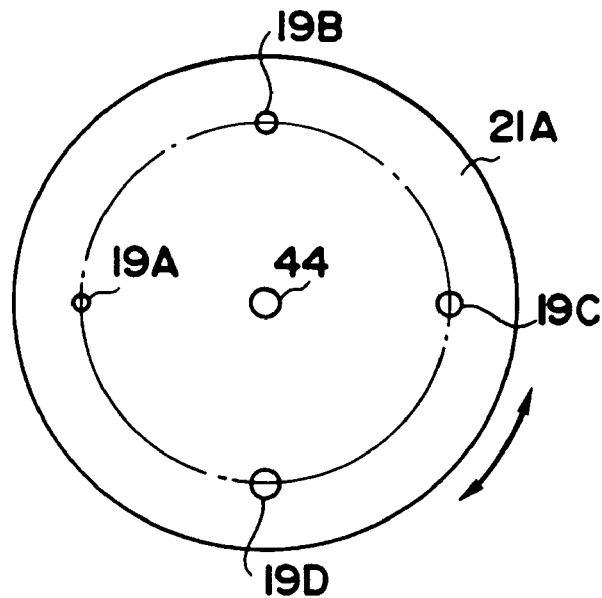
FIG. 6 is a drawing showing another variation of the reflection diffracting part.
Figure 7:
FIG. 7 is a drawing showing yet another variation of the reflection diffracting part.
Figure 8:
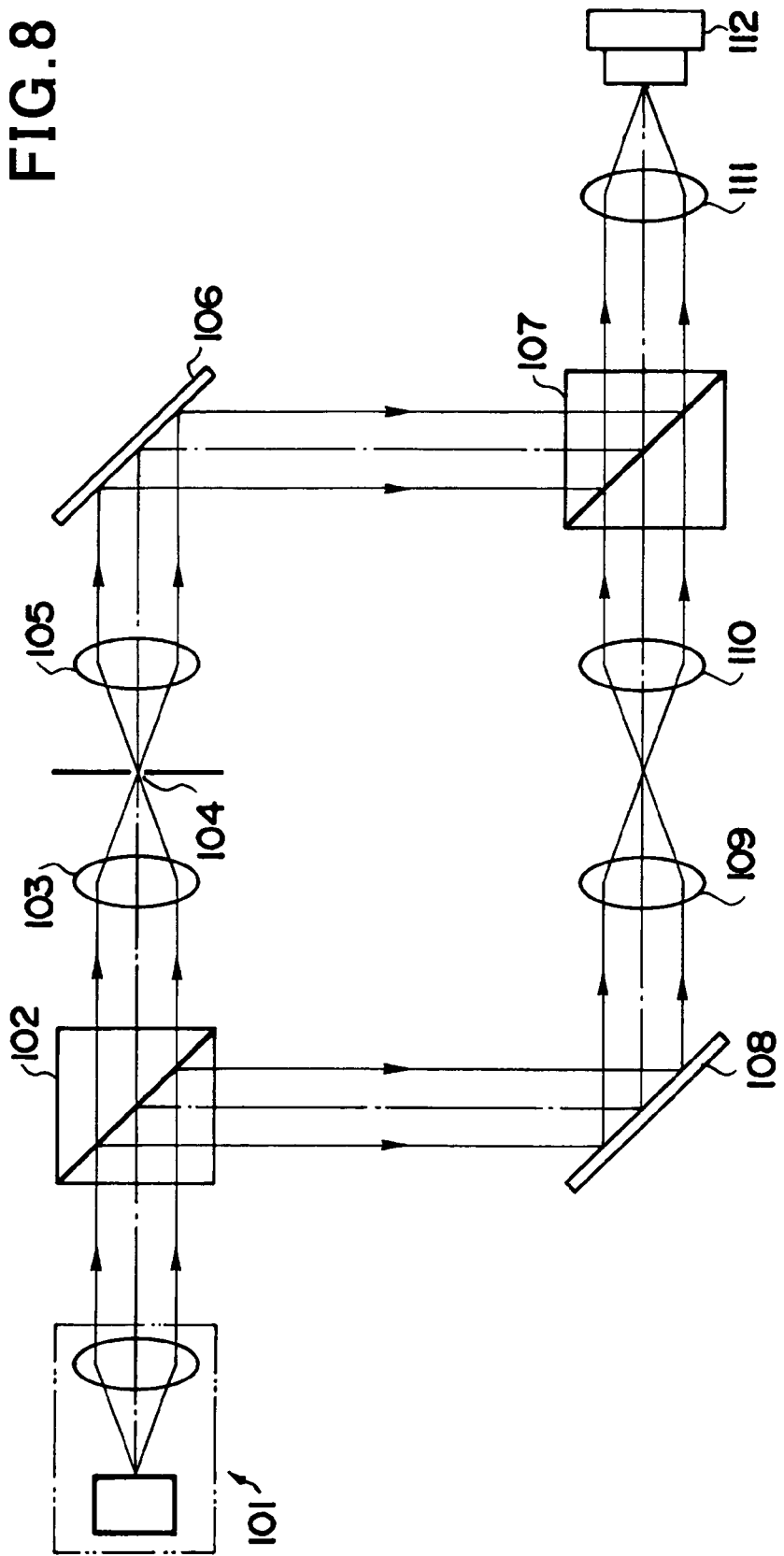
FIG. 8 is a schematic drawing of the constitution of a conventional wavefront-measuring interferometer apparatus.

Following is a description of variations of the form of the reflection diffracting part 19, with reference to FIGS. 5 to 7. The reflection diffracting part 19E shown in FIG. 5 comprises a metal film formed by vapor deposition or the like on a substrate 21B having a curved surface such as a spherical surface. With this form, due to the substrate 21B having a curved surface, the converged luminous flux incident on the substrate 21B from a converging lens disposed to the left in the drawing (omitted from the drawing) can be prevented from being reflected back toward the converging lens, and hence generation of light noise can be suppressed.

The reflection diffracting parts 19A to 19D shown in FIG. 6 each comprise a metal film formed by vapor deposition or the like on a disk-shaped substrate 21A, and the constitution is such that the reflection diffracting parts 19A to 19D have different sizes to one other. Moreover, the substrate 21A is constituted so as to be rotatable in the plane of the paper about a rotation axis 44. With this form, one out of the reflection diffracting parts 19A to 19D can be selected and disposed at the convergent point of a converging lens disposed in front of the plane of the paper, this being in accordance with the NA or the like of the converging lens.

The reflection diffracting part 19F shown in FIG. 7 is constituted from a pinhole 45 that is made to be smaller than the diffraction limit of an incident converged luminous flux, and a reflecting surface 47 that is disposed immediately behind the pinhole 45. With this form, there will be no change in the wavefront shaping function even if the relative position between the pinhole 45 and the reflecting surface 47 is shifted along the reflecting surface 47. There is thus an advantage that in the case that the part of the reflecting surface 47 that faces out through the pinhole 45 is damaged and hence the function thereof is lost, the function can easily be restored by shifting the pinhole 45 relative to the reflecting surface 47.

[Effects of the Invention]

According to the wavefront-measuring interferometer apparatus according to the present invention, the distinct functions that have been borne by two respective beam splitters in a conventional Mach-Zehnder interferometer apparatus, i.e. the function of dividing the light beam from the light source unit into reference light and sample light, and the function of combining the reference light and the sample light, are borne by one semi-transmitting reflecting surface, and hence the optical system can be made simple and compact, and moreover adjustment of the optical system can also be carried out easily. The apparatus is thus highly practical, for example wavefront measurement can easily be carried out on coherent light such as laser light, and moreover it is easy to secure the space for installing the apparatus.

Moreover, according to the light beam measurement apparatus and method thereof according to the present invention, due to having the constitution described above, wavefront measurement on a light beam and light beam spot characteristic measurement can be carried out simultaneously.

Moreover, in the case that the sample/reference luminous flux dividing means is constituted from a semi-transmitting/reflecting surface, the optical system can be made simple and compact, and moreover adjustment of the optical system can also be carried out easily.

What is claimed is:

1. A wavefront-measuring interferometer apparatus comprising:
   a semi-transmitting/reflecting surface that reflects part of a light beam to be measured back in the opposite direction to the direction of incidence as a sample luminous flux;
   a reference light producing device, which has a converging lens that converges a transmitted luminous flux transmitted through said semi-transmitting/reflecting surface, and a minute reflection diffracting part disposed at the convergent point of said converging lens, and converts part of said transmitted luminous flux incident thereon from said semi-transmitting/reflecting surface into a wavefront-shaped reference luminous flux, and outputs said reference luminous flux toward said semi-transmitting/reflecting surface; and
   an image-forming part that has a detection surface, and leads, to said detection surface, interfering light obtained by combining said reference luminous flux and said sample luminous flux, so as to form interference fringes on said detection surface;
   wherein the wavefront-measuring interferometer apparatus is constituted to carry out wavefront measurement on said light beam based on said interference fringes formed on said detection surface.

2. The wavefront-measuring interferometer apparatus according to claim 1, further having an optical path length adjusting device that adjusts the optical distance between said semi-transmitting/reflecting surface and said reference light producing device by moving at least one of said semi-transmitting/reflecting surface and said reference light producing device in the direction of the optical axis.

3. The wavefront-measuring interferometer apparatus according to claim 1 wherein said reference light producing device holds a plurality of reflection diffracting parts having different sizes to one other, and is constituted such that any one of said reflection diffracting parts can be selected and disposed at said convergent point.

4. The wavefront-measuring interferometer apparatus according to claim 1, wherein a surrounding region around said reflection diffracting part is constituted in a shape such that said transmitted luminous flux incident on said surrounding region via said converging lens can be suppressed from being reflected back toward said converging lens.

5. A light beam measurement apparatus comprising:
   a luminous flux dividing device that divides a light beam to be measured into two luminous fluxes;
   a semi-transmitting/reflecting surface that reflects part of one luminous flux out of said two luminous fluxes that have been divided by said luminous flux dividing device back in the opposite direction to the direction of incidence as a sample luminous flux;
   a reference light producing device, which has a converging lens that converges a transmitted luminous flux transmitted through said semi-transmitting/reflecting surface, and a minute reflection diffracting part disposed at the convergent point of said converging lens, and converts part of said transmitted luminous flux incident thereon from said semi-transmitting/reflecting surface into a wavefront-shaped reference luminous flux, and outputs said reference luminous flux toward said semi-transmitting/reflecting surface;
   a first image-forming part that has a first detection surface, and leads, to said first detection surface, interfering light obtained by combining said reference luminous flux and said sample luminous flux, so as to form interference fringes on said first detection surface; and
   a second image-forming part that has a second detection surface, and forms, on said second detection surface, a spot image of the other luminous flux out of said two luminous fluxes that have been divided by said luminous flux dividing device;
   wherein the light beam measurement apparatus is constituted so as to carry out wavefront measurement on said light beam based on said interference fringes formed on said first detection surface, and carry out light beam spot characteristic measurement based on said spot image formed on said second detection surface.

6. The light beam measurement apparatus according to claim 5, constituted such that said interfering light is led to said first detection surface via said luminous flux dividing device.

7. The light beam measurement apparatus according to claim 5, further having an optical path length adjusting device that adjusts the optical distance between said semi-transmitting/reflecting surface and said reference light producing device by moving at least one of said semi-transmitting/reflecting surface and said reference light producing device in the direction of the optical axis.

8. The light beam measurement apparatus according to claim 5, wherein said reference light producing device holds a plurality of reflection diffracting parts having different sizes to one other, and is constituted such that any one of said reflection diffracting parts can be selected and disposed at said convergent point.

9. The light beam measurement apparatus according to claim 5, further having a light-shielding device that blocks off the optical path between said semi-transmitting/reflecting surface and said reference light producing device.

10. The light beam measurement apparatus according to claim 5, constituted such that said reflection diffracting part can be moved to a position away from the optical path.

11. The light beam measurement apparatus according to claim 5, wherein a surrounding region around said reflection diffracting part is constituted in a shape such that said transmitted luminous flux incident on said surrounding region via said converging lens can be suppressed from being reflected back toward said converging lens.

12. A light beam measurement method that enables both wavefront measurement on a light beam to be measured and spot characteristic measurement on said light beam, the light beam measurement method comprising:
   an interference fringe production procedure of dividing said light beam into a sample luminous flux for wavefront measurement, and a reference luminous flux-producing luminous flux, converting said reference luminous flux-producing luminous flux into a reference luminous flux by wavefront shaping, and then making said sample luminous flux and said reference luminous flux interfere with one another so as to form interference fringes that hold wavefront information on said sample luminous flux;
   a spot image production procedure of dividing off, as a spot-producing luminous flux, part of said light beam before said light beam is divided into said sample luminous flux and said reference luminous flux-producing luminous flux, or part of said sample luminous flux after said sample luminous flux has been divided off, or part of said reference luminous flux-producing luminous flux before said reference luminous flux-producing luminous flux is subjected to the wavefront shaping, and forming a spot image from said spot-producing luminous flux;

a first analysis procedure of analyzing said interference fringes to obtain wavefront measurement results on said light beam; and a second analysis procedure of analyzing said spot image to obtain light beam spot characteristic measurement results on said light beam, the light beam measurement method further comprising:

directing said light beam so as to be incident on a semi transmitting/reflecting surface, reflecting part of said light beam incident on the semi transmitting/reflecting surface back in an opposite direction to a direction of incidence as said sample luminous flux, and transmitting a remainder of said light beam as said reference luminous flux-producing luminous flux.

13. A light beam measurement method that enables both wavefront measurement on a light beam to be measured and spot characteristic measurement on said light beam, the light beam measurement method comprising:

an interference fringe production procedure of dividing said light beam into a sample luminous flux for wavefront measurement, and a reference luminous flux-producing luminous flux, converting said reference luminous flux-producing luminous flux into a reference luminous flux by wavefront shaping, and then making said sample luminous flux and said reference luminous flux interfere with one another so as to form interference fringes that hold wavefront information on said sample luminous flux;

a spot image production procedure of dividing off, as a spot-producing luminous flux, part of said light beam before said light beam is divided into said sample luminous flux and said reference luminous flux-producing luminous flux, or part of said sample luminous flux after said sample luminous flux has been divided off, and forming a spot image from said spot-producing luminous flux;

a first analysis procedure of analyzing said interference fringes to obtain wavefront measurement results on said light beam; and a second analysis procedure of analyzing said spot image to obtain light beam spot characteristic measurement results on said light beams, the light beam measurement method further comprising:

directing said light beam so as to be incident on a semi transmitting/reflecting surface, reflecting part of said light beam incident on a semi transmitting/reflecting surface back in an opposite direction to a direction of incidence as said sample luminous flux, and transmitting a remainder of said light beam as said reference luminous flux-producing luminous flux.

* * * * *